UNITED STATES PATENT OFFICE.

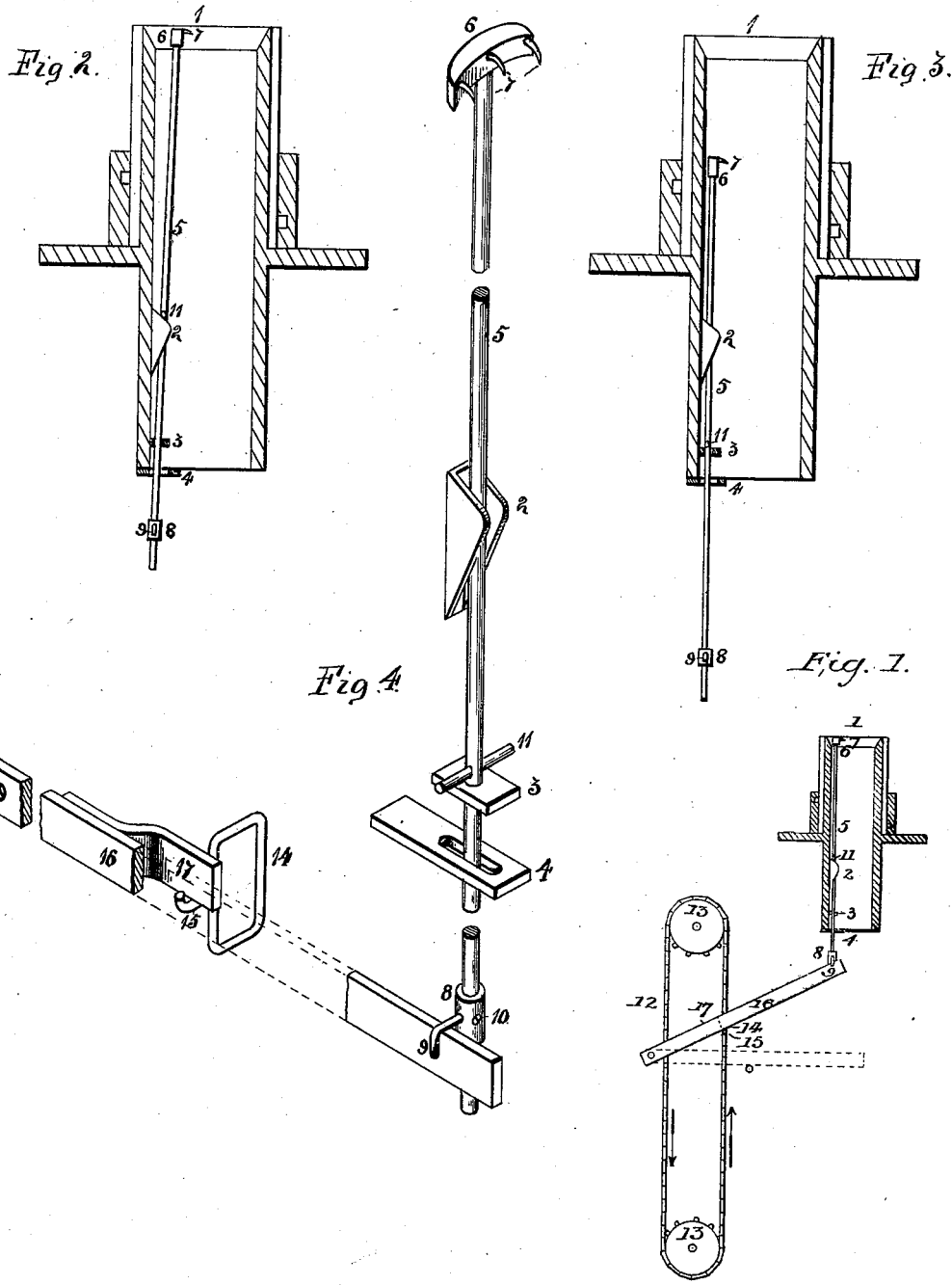

ADOLPH BOEHMEN, OF ROCKFORD, ILLINOIS.

HEEL-HOOK FOR KNITTING-MACHINES.

SPECIFICATION forming part of Letters Patent No. 595,365, dated December 14, 1897.

Application filed January 19, 1893. Serial No. 459,009. (No model.)

*To all whom it may concern:*

Be it known that I, ADOLPH BOEHMEN, a citizen of the United States, residing at Rockford, in the county of Winnebago and State of Illinois, have invented certain new and useful Improvements in Heel-Hooks for Knitting-Machines, of which the following is a specification.

The object of this invention is to construct and adapt a hook to knitting-machines which is raised to working position by moving parts of the machine and by action of gravity will engage the stocking, when the weight of the hook will be suspended from the stocking during the continued knitting, assisting in casting off the stitch; and the further object of this invention is to locate the hook inside of the needle-cylinder, but outside of the stocking, which location permits the knitting of a continuous web.

In the accompanying drawings, Figure 1 is a fragmental view of the parts necessary to show the relation and operation of my improvements. Fig. 2 is a vertical central section of the needle-cylinder, showing the hook in engagement with the fabric. Fig. 3 is a like view showing the hook in its lowest position. Fig. 4 is an enlarged view of the hook and its connections.

The needle-cylinder 1 is of the usual construction and needs no further description. To the inside of the cylinder, near its lower end, is secured a grooved incline 2, and below this incline is secured a perforated guide and support 3 and a slotted guide 4. The hook is composed of a shank portion 5, having a cross-bar 6 at its upper end provided with downwardly-inclined teeth 7. The lower end has a collar 8, from which projects a downwardly-extending hook 9. This collar is made adjustable along the shank by means of the set-screw 10. A pin 11 extends through the shank above the guide 3. This hook is placed within the needle-cylinder and passed through the guides 3 and 4 before collar 8 is placed in position. The pin 11 prevents the hook from descending below a certain point, and, in connection with the cross-bar 6, which comes in contact with the inside of the cylinder, prevents the rotation of the shank and holds the teeth 7 in proper position to engage the fabric.

The means for raising the hook consists of the following instrumentalities: An endless chain 12 passes over sprocket-wheels 13, and from one of the links 14 of the chain extends an outwardly-upcurving hook 15. A bar 16 has a pivotal connection with a stationary support and extends across the face of the endless chain, its free end lying under the lower end of the shank of the hook. From the side of the bar facing the endless chain extends an arm 17, having one end secured to the bar and the other disconnected from it, as shown in Fig. 4, which lies close to the endless chain and which will be operated upon by the hook 15 on the endless chain. The endless chain is driven from either sprocket-wheel, motion to the sprocket-wheel being conveyed from other moving parts of the knitting-machine. The chain moves in the direction indicated by the arrows, and as the hook 15 comes in contact with the arm 17 of the bar 16 the bar is moved on its pivot, which will raise the free end of the bar until the hook 15 slips off the end of the arm 17, when the bar 16 will drop to its normal position until another revolution of the endless chain. The raising of the free end of the bar 16 by its engagement with the under side of the hook 9 will raise the hook from the position shown at Fig. 3 to that shown at Fig. 1, and in the rising movement of the hook the pin 11 will ride up the outer incline face of the grooved incline 2 and, owing to the downward inclination of the teeth 7, will not engage the knitted fabric, and when the bar 16 has dropped to its normal position the hook will also have a tendency to drop, and in so doing the pin 11 must travel the same path it did during the rising movement of the hook. This will throw the upper end of the hook toward the center of the needle-cylinder, and when the pin descends the upper end of the incline the teeth 7 will enter the fabric and the weight of the hook will be supported by the fabric until the pin 11 rests upon and is supported by the guide 3, when the fabric will continue to descend, thereby relieving itself from the teeth of the hook. In the employment of the hook as a heel-hook its upward movement is so timed that the teeth 7 will engage the heel portion of the stocking at the commencement of the last half of the heel.

It is evident that a straight machine might be equipped with my improved heel-hook.

By locating the heel-hook within the needle-cylinder and outside of the knitted fabric the fabric can be knitted in a continuous web, and the hook at predetermined intervals will engage the fabric near the upper end of the needle-cylinder.

I claim as my invention—

1. The combination with the needle-cylinder of a circular-knitting machine, of a single-heel tension device engaging the center of the heel-web upon the outside of the same as it is being knit, whereby a tension is exerted upon the needles in operation from the device as a center, substantially as described.

2. The combination with the needle-cylinder of a circular-knitting machine, of a single-heel tension-hook engaging the center of the heel-web on the outside of the same as it is being knit, whereby a tension is exerted upon the needles in operation from the hook as a center, substantially as described.

3. The combination with a needle-cylinder having a support and a guide for a heel-hook secured to the inner side of the same, of a heel-hook engaging said support and guide, the said construction including provisions for throwing the heel-hook toward the center of the cylinder to engage the outside of the stocking and to cause the same to clear the support and guide as it descends, substantially as described.

4. The combination with a needle-cylinder having a support and guide for a heel-hook secured to the inner side of the same, of a heel-hook engaging said support and guide said heel-hook being provided with means engaging said guide whereby it is forced toward the center of the cylinder in passing said guide, substantially as described.

5. The combination with the heel-hook for a knitting-machine having the pin extending on opposite sides of the shank of the hook, of means for elevating the hook and the guide for giving the hook a lateral movement, substantially as described.

6. The combination with the heel-hook for a knitting-machine having a pin extending on opposite sides of the shank of the hook, of the bracket through which the shank passes, means for elevating the hook and the guide for giving a lateral movement to the hook, substantially as described.

7. A hook for knitting-machines provided with teeth near its upper end, a collar near its lower end, and a pin through the shank portion, a grooved incline and guideways secured to the needle-cylinder, a pivoted lever, and an endless chain provided with a projection which engages the pivoted lever.

ADOLPH BOEHMEN.

Witnesses:
E. E. CUMMINGS,
A. O. BEHEL.